United States Patent [19]
Moddel

[11] Patent Number: 5,177,628
[45] Date of Patent: Jan. 5, 1993

[54] SELF-POWERED OPTICALLY ADDRESSED SPATIAL LIGHT MODULATOR

[75] Inventor: Garret R. Moddel, Boulder, Colo.

[73] Assignee: The University of Colorado Foundation, Inc., Boulder, Colo.

[21] Appl. No.: 513,731

[22] Filed: Apr. 24, 1990

[51] Int. Cl.$^5$ ............................................. G02F 1/135
[52] U.S. Cl. .................................... 359/72; 359/100
[58] Field of Search .................. 350/342, 331 R, 338, 350/332, 339, 351

[56] References Cited

U.S. PATENT DOCUMENTS

| | | | |
|---|---|---|---|
| 3,824,002 | 7/1974 | Beard | 350/342 |
| 4,367,924 | 1/1983 | Clark et al. | 350/334 |
| 4,475,031 | 10/1984 | Mockovciak, Jr. | 350/331 R X |
| 4,482,473 | 11/1984 | Yamanashi et al. | 350/349 X |
| 4,538,884 | 9/1985 | Masaki | 350/342 X |
| 4,620,322 | 11/1986 | Eggenschwiler et al. | 350/331 R X |
| 4,693,561 | 9/1987 | Ashley | 350/342 X |
| 4,728,174 | 3/1988 | Grinberg et al. | 350/334 |
| 4,787,713 | 11/1988 | Lu et al. | 350/342 |
| 4,842,376 | 6/1989 | Braatz et al. | 350/342 |
| 4,908,584 | 3/1990 | Reichman | 350/342 X |

OTHER PUBLICATIONS

"Photoaddressing of High Speed Liquid Crystal Spatial Light Modulators", by Garret Moddel, Kristina Johnson, Mark A. Handschy. Proceedings of SPIE—The International Society for Optical Engineering, vol. 754, 13-15, Jan. 1987, pp. 207-212.

"Amorphous Silicon photoconductor in a liquid crystal spatial light modulator" by P. R. Ashley & J. H. Davis, Applied Optics, Jan. 15, 1987, vol. 26, No. 2, pp. 241-246.

"High-speed light valve using an amorphous silicon photosensor and ferroelectric liquid crystals", by N. Takahashi, H. Asada, M. Miyahara and S. Kurita, Applied Physics Letters, vol. 51, No. 16, Oct. 19, 1987.

*Primary Examiner*—William L. Sikes
*Assistant Examiner*—Ron Trice
*Attorney, Agent, or Firm*—Earl C. Hancock; Francis A. Sirr

[57] ABSTRACT

A self-powered liquid crystal spatial light modulator is disclosed having a pair of spaced transparent glass plates, on each plate of which a transparent electrically conductive film is coated so as to be in confronting relation. A voltage/current generating, photovoltaic/photodiode, light sensitive layer is coated onto one of the conductive films. A liquid crystal layer is confined between the other conductive film and the light sensitive layer. A shorting circuit element connects the two conductive films. This shorting circuit element may be internal or external to the spatial light modulator. A pixel area of the spatial light modulator is addressed by a beam of light that illuminates the pixel area and operates to activate a corresponding area of the light sensitive layer. The voltage/current that is generated in this area of the light sensitive film causes a current to flow through the shorting circuit element, to thereby activate, switch or charge the corresponding area of the liquid crystal layer. Transmission mode and reflection mode spatial light modulators are described.

16 Claims, 2 Drawing Sheets

SELF-POWERED OPTICALLY ADDRESSED SPATIAL LIGHT MODULATOR

FIELD OF THE INVENTION

This invention relates to the field of optical systems and elements, and more specifically to optically addressable spatial light modulators or light valves incorporating liquid crystal means.

BACKGROUND OF THE INVENTION

Spatial light modulators (SLM or SLMs), as the term is used herein, are optical masks having one or more small picture element, PEL or pixel areas that are individually and selectively switchable by the operation of one or more writing light beams. SLMs that have been selectively written in this manner (i.e. data has been stored therein) are then used to modulate a reading optical wavefront, causing the reading wavefront to be either transmitted through the SLM (i.e. a transmission mode device), or causing the reading wavefront to be reflected from the SLM (i.e. a reflection mode device), the transmitted or reflected reading wavefront having a polarized pixel portions as is determined by the data stored in the modulator's corresponding pixel portions.

These optical masks are usually two-dimensional, and may comprise a plurality of small pixel areas that may be arranged in a two or a three dimensional matrix of pixel rows and pixel columns.

In an optically addressable SLM, a write beam(s), for example a visible laser beam(s), programs or activates the individual pixels of the SLM to subsequently rotate the polarization, change the amplitude, or retard the phase of a read beam(s), for example an infrared laser beam(s). The write beam(s) programs the SLM by activating individual photosensitive pixel areas of the SLM. That is, those modulator areas that are to be programmed to rotate the polarization, change the amplitude or retard the phase of a read beam(s) are activated by a write beam(s).

U.S. Pat. No. 4,538,884 is an example of such an SLM. In the device of this patent, a pair of glass plates 1a and 2a support a pair of transparent electrodes 2a and 2b having a external source of voltage (not shown) applied thereto. A photoconductive layer 9, which can be amorphous silicon is supported on electrode layer 2b. A plurality of aluminum reflectors 8 are incorporated into a transparent insulating layer 7 and are supported on the surface of the photoconductive layer, with the reflectors directly adjacent to the photoconductive layer. An apertured shading layer 5 of carbon or metal is carried on the transparent insulating layer, each apertures 6 facing one of the reflectors. The space intermediate transparent insulating layer 7 and transparent electrode 2a is occupied by a liquid crystal 3.

The types of known liquid crystals include nematic liquid crystals, cholestic liquid crystals, smectic liquid crystals, and chiral smectic liquid crystals, of which electroclinic smectic A* and ferroelectric smectic C* are two examples.

A preferred liquid crystal material useful in the practice of the present invention, but without limitation thereto, is ferroelectric smectic C* or H liquid crystal material described in U.S. Pat. No. 4,367,924.

A preferred voltage/current generating light sensitive layer useful in the practice of the present invention, but without limitation thereto, is a hydrogenated amorphous silicon (a-Si:H) photovoltaic/photodiode layer.

The use of amorphous silicon photoconductor means in a liquid crystal SLM is suggested in the article "Amorphous silicon photoconductor in a liquid crystal spatial light modulator", by Paul R. Ashley and Jack H. Davis, APPLIED OPTICS, Jan. 15, 1987, Vol. 26, No.2, at pages 241-246. The device of this article uses an external bias voltage supply.

The use of amorphous silicon photoconductor means and ferroelectric liquid crystal means in a liquid crystal device is suggested in the article "High-speed light valve using an amorphous silicon photosensor and ferroelectric liquid crystals", by N. Takahashi, H. Asada, M. Miyahara and S. Kurita, APPLIED PHYSICS LETTERS, Vol. 51, No. 16, 19 Oct. 1987. Here again an external power supply is required.

The device of the present invention differs from prior art devices in that it is self-powered, i.e. no externally applied electrical power is required. Rather, the invention provides an internal photovoltaic/photodiode light sensitive layer and a liquid crystal layer that are sandwiched between two electrically conductive and light transparent layers. An electrical short circuit (i.e. a low impedance circuit) interconnects the two electrically conductive layers.

The use of a ferroelectric liquid crystal in an SLM having reflective mode photodiode or photoconductive amorphous silicon portions is suggested in THE PROCEEDINGS OF SPIE—THE INTERNATIONAL SOCIETY FOR OPTICAL ENGINEERING, Vol. 754, 13-15 Jan. 13-15 1987, at pages 207-212. In the photodiode embodiment of this article, an external voltage source is applied to the SLM to reverse bias the photodiode. When the photodiode is in the dark, the supply voltage is dropped across it, and the ferroelectric liquid crystal is maintained in its off state. When the photodiode is illuminated, the photodiode produces a current that charges the ferroelectric liquid crystal and switches the crystal to its on state.

The use of external solar cells to power liquid crystal devices is taught by the art. For example U.S. Pat. No. 4,475,031 describes a sun sensitive window, and U.S. Pat. No. 4,620,322 describes a welder's eyeshield, having liquid crystal elements wherein a solar cell that is external of the liquid crystal element is used to activate the device. Note that in each case, the solar cell is an external source of power, and is not an integral part of the light modulating device. That is, the incoming light wavefront does not both activate selected areas of the device, and at the same time cause an operating voltage/current to be generated.

These patents thus fail to teach the present invention wherein a self powered SLM, having no external power source is created by using a photovoltaic film whose selectively illuminated pixel area or areas generate the power that is required to switch only the corresponding pixel areas of the liquid crystal.

SUMMARY OF THE INVENTION

This invention relates to a device that modulates a reading light wavefront that is transmitted through the device, or in an alternate embodiment is reflected by the device, in response to the device being written by a writing light source, i.e. this invention relates to spatial light modulators (SLMs). In optically addressable modulators of this type the reading light may also comprise the writing light, wherein the light is partially absorbed in, and thus activates, the photosensitive layer.

The device of this invention differs from prior art devices of this general class in that no externally applied electrical power is required. Rather, the entire multi-PEL area of the SLM is covered by an internally located photovoltaic/photodiode light sensitive layer, such that selective write activation of a pixel or PEL area within this light sensitive layer causes a localized voltage to be generated only in these selectively activated PEL areas, and thus causes only the corresponding PEL areas of an adjacent liquid crystal layer to be switched.

A wide range of applications exist for the device, including use as an image amplifier, an incoherent-to-coherent converter, an infrared-to-visible converter, etc.. Some applications suited to the self-powered device of the invention are self-darkening window panes, sunglasses and safety goggles.

More specifically, a SLM in accordance with the invention includes two transparent glass sheets that are each coated with a layer of transparent electrically conducting material, a voltage/current generating light sensitive layer and a liquid crystal layer are sandwiched between the two conducting layers, and an electrical conductor means providing a short circuit (i.e. a low impedance circuit) interconnects the two conducting layers.

The voltage/current generating light sensitive layer is preferably a hydrogenated amorphous silicon (a-Si:H) photodiode layer.

The liquid crystal layer is preferably a ferroelectric crystal (FLC) layer operating in its asymmetric and not-bistable mode. The curve that plots reading light intensity verses voltage applied to the liquid crystal layer, for such a liquid crystal layer, produces a ferroelectric hysterisis curve that is offset to negative voltages, rather than being centered on the zero volts vertical axis. This asymmetry can enhange the dynamic range of the liquid crystal's response, but it is not essential to the present invention.

As used herein, the terms photovoltaic light sensitive layer, photodiode light sensitive layer, voltage/current generating light sensitive layer, and the like, is intended to mean the class of materials, such as photocells, photodiodes and solar cells, for example, that exhibit an actinoelectric effect or property, whereby the material generates an electrical voltage and/or current on exposure to light of a wavelength to which the material is sensitive.

As a feature of the invention, a reflector may be provided as a metallic layer or as a dielectric stack to form a reflection mode SLM. The reflector is eliminated in an alternate construction, to thereby form a transmission mode SLM.

When the liquid crystal layer of the invention is selected to be a FLC layer, a FLC alignment layer is formed to produce a built-in crystal bias, that is, the crystal layer preferentially aligns itself to one crystal orientation.

When the photovoltaic layer is illuminated (i.e. data is stored in the SLM, or the SLM is written) by a write light illumination source, the photovoltaic layer produces a voltage/current that rotates the crystals of the FLC into the other orientation. thus switching the FLC from an off to an on condition, for example In this construction, the FLC has no way to lose its charge, and thus switch off, when the write illumination is subsequently terminated.

As a feature of the invention, a effective resistance path shunts the photovoltaic layer, and provides a path for the charge in the FLC layer to leak through when write illumination is terminated. The electrical effect of this shunt resistance path may be formed by producing a photodiode layer so as to have imperfect current-blocking contacts.

In another embodiment of the invention, the leakage circuit path for the charge in the FLC layer is provided by an effective resistance path that shunts the FLC layer. This electrical effect may be accomplished by including appropriate ionic impurities in the FLC layer.

A variation of the invention provides a device in which a small external electrical bias is provided in the short circuit path, this bias replacing the use of a crystal-biased FLC layer. In the absence of writing light, this low magnitude externally applied bias source switches the FLC layer off. The magnitude of this external bias source may be nearly as large as the open circuit voltage of the photodiode layer (i.e. on the order of 0.25 DC volts in magnitude for a single P-I-N layer, or as high as perhaps 2.0 DC volts when multiple P-I-N layers are provided). Write light produces a photovoltaic effect in the photovoltaic layer on the order of 0.5 DC volts and of the opposite polarity to the external source, thus switching the FLC on. When the write light source is terminated, the voltage across the photovoltaic layer decreases, and the voltage polarity that is then applied to FLC layer is reversed, returning FLC layer to the off state.

An object of the present invention is to provide a spatial light modulator having a pair of physically spaced transparent electrically conductive films in confronting relation to each other, a voltage/current generating light sensitive film on one of the conductive films in confronting relation to the other of the conductive films, a liquid crystal layer confined between the other conductive film and the light sensitive film, and a shorting circuit element interconnecting the two conductive films.

As a feature of the invention, a pair of transparent glass plates are provided to support the pair of conductive films.

As a further feature of the invention, light reflector means (i.e. a plurality of electrically conductive reflectors, or a single dielectric layer reflector) are located between a photovoltaic/photodiode light sensitive film and the liquid crystal layer, to thereby provide a reflection mode spatial light modulator.

As yet a further feature of the invention, a self powered spatial light modulator (SLM) is provided having a continuous photovoltaic/photodiode light sensitive film that covers the entire SLM, thus allowing a writing beam to activate only selected pixel portions of the light sensitive film, and thus causing a voltage to be generated only in such selected pixel portions of the light sensitive film, to thereby cause an adjacent liquid crystal film to switch only in its corresponding pixel portions.

These and other objects and advantages of the invention will be apparent to those of skill in the art upon reference to the following detailed description of embodiments of the invention, which description makes reference to the drawing.

DETAILED DESCRIPTION OF THE INVENTION

This invention relates to a self-powered spatial light modulator that operates to modulate a reading electromagnetic radiation or light wavefront. In accordance with the spirit and scope of the invention, the self-powered SLM includes a photovoltaic or photodiode voltage/current generating radiation sensitive layer or film that covers the planar area of the modulator. A liquid crystal layer or film also covers the planar area of the modulator, and is placed in electrical contact with a first surface of the radiation sensitive layer. An electrical short circuit connects the other surface of the liquid crystal film to a second surface of the radiation sensitive layer.

In operation, writing radiation operates to activate selected pixel or PEL portions of the voltage/current generating layer, thus causing a voltage to be generated in these selected portions of the layer. An electrical current now flows through a series circuit that comprises those portions of the liquid crystal film that positionally correspond to the selected portions of the voltage/current generating layer and the above mentioned short circuit connection.

As a result of this current flow, the liquid crystal film is charged or activated in the portions thereof that positionally corresponding to the selected portions of the voltage/current generating layer, and in this way data is stored in the liquid crystal film.

This activation of selected portions of the liquid crystal film operates to cause the SLM to modulate a reading wavefront, i.e. to change the state of polarization of those portions of the reading wavefront that impinge upon the activated portions of the liquid crystal film wherein data is stored.

As used herein, the terms photovoltaic layer, photodiode layer and voltage/current generating layer and film will be used interchangeably. The terms pixel and PEL will also be used interchangeably. The terms light and electromagnetic radiation will also be used interchangeably herein.

Figure 1:
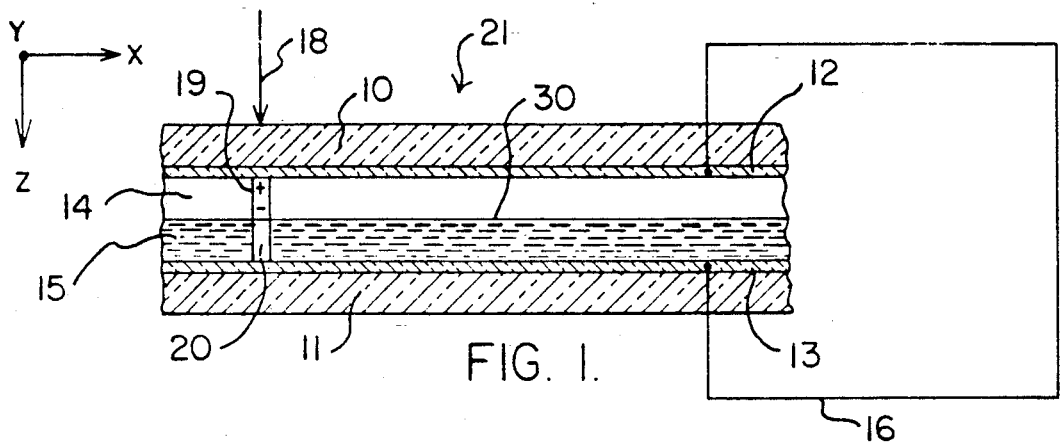
FIG. 1 is a side section view of a portion of a SLM in accordance with the invention, for example, a multi-pixel portion of a transmission mode SLM matrix or array.
Figure 2:
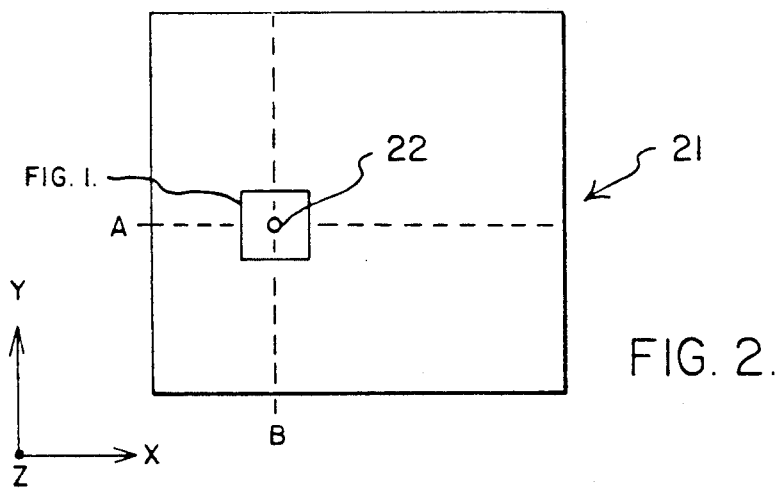
FIG. 2 is a top plan view of a two dimensional, X-Y coordinate system, SLM array constructed in accordance with the invention, and showing an exemplary physical location of the multi-pixel portion of FIG. 1 within this array.

In the FIG. 1-2 embodiment of the invention, information or data that is optically stored in transmission mode SLM 21 by the operation of a writing radiation beam or beams 18, and is optically readout by the use of a reading electromagnetic radiation wavefront (not shown) that is transmitted through the SLM. More specifically, FIG. 1 is a side section view of a portion of a transmission mode SLM 21 in accordance with the invention. For example, FIG. 1 shows a small multi-pixel portion of the larger transmission mode SLM array 21 that is shown in the top plan view of FIG. 2. For example, SLM 21 of FIG. 2 may comprise a 128×128 or a 1024×1024 pixel matrix.

The above mentioned write and read functions can be performed by the same beam, a fraction of which beam is absorbed in the photodiode layer, with the remainder of the beam being transmitted through the SLM.

Assume for the moment that write beam 18 operates to activate one individual pixel area 19,20 within the multi-pixel area of FIG. 1 (i.e. pixel 22 of FIG. 2). FIG. 2 is a top plan view of the large two dimensional, X-Y coordinate system SLM array 21, wherein the physical location of this individually activated pixel area 19,20 is located at the intersection 22 of horizontal pixel row A and vertical pixel column B of the large pixel array 21.

With reference to FIG. 1, the entire multi-pixel planar area of FIGS. 1-2 is covered by a photovoltaic light sensitive layer 14, such that selective write activation of a pixel area 22 (shown in FIG. 2) by writing light beam 18 causes a localized voltage/current to be generated in photovoltaic layer 14 only at the corresponding physical location 19 (FIG. 1) within layer 14.

FIG. 1 shows photovoltaic layer 14 as being a single P-I-N layer. However, within the spirit and scope of this invention layer 14 may comprise multiple P-I-N layers, in which case the voltage/current generated thereby is correspondingly increased. For example, it may be desirable to select a multi P-I-N layer construction in order to match the voltage/current characteristics of photovoltaic layer 14 to that of liquid crystal layer 15.

The entire planar area of SLM 21 is also covered by a liquid crystal layer or film 15. The localized voltage/current that is generated within photovoltaic layer 14 now causes an electrical current to flow through shorting circuit means 16, so as to cause only the corresponding pixel area 20 of the adjacent liquid crystal layer 15 to be switched.

In an alternate construction, when the SLM of the invention comprises one large, single pixel, (i.e. when spatial operation within the SLM is not desired, as in the case of a self darkening window pane, or a self darkening goggle) a transparent and electrically conductive layer 30 of FIG. 1 is provided between photovoltaic layer 14 and liquid crystal layer 15. Layer 30 covers the entire planar area of SLM 21. As a result of the current conducting operation of layer 30, the localized voltage/current that is generated in any group of pixel portions within photovoltaic layer 14, as was indicated at 19, is transmitted to the entire planar area of liquid crystal layer 15, thus causing the entire liquid crystal layer to switch. This is an example of the use of a single light source to both write the SLM and to read the SLM, due to the fact that the input light will be attenuated (as the window pane of goggle darkens), but a quantity of this activating light will also be transmitted through the SLM.

The SLM of FIGS. 1-2 includes two transparent glass sheets or flats 10 and 11 that are each coated with a layer of transparent electrically conducting oxide material 12 and 13. Light sensitive layer 14 and liquid crystal layer 15 are sandwiched between these two conducting layers 12 and 13. The surfaces of light sensitive layer 14 and conducting layer 13 against which liquid crystal layer 15 abuts may include a crystal alignment layer (not shown), as is well known by those skilled in the art.

In accordance with the invention, an internal or an external electrical conductor shorting means 16 provides a short circuit (i.e. a low impedance circuit) that interconnects the two conducting layers 12,13.

Without limitation thereto, photovoltaic light sensitive layer 14 is preferably a hydrogenated amorphous silicon (a-Si:H) photodiode layer (shown schematically as a photodiode 40 in FIGS. 4–7), and liquid crystal layer 15 is preferably a ferroelectric liquid crystal (FLC) layer (shown schematically as a capacitor 41 in FIGS. 4–7) operating in its asymmetric mode.

When the liquid crystal layer of the invention is selected to be a FLC layer, the FLC layer is formed to have a built-in crystal bias by the use of the above mentioned crystal alignment layers on the abutting surface of light sensitive layer 14 and conductive layer 13. That is, the crystal layer preferentially aligns itself to one crystal orientation. This results in a ferroelectric hysterisis curve that is offset to negative voltages, rather than being centered at zero volts, as above described.

When photovoltaic layer 14 is illuminated (i.e. when the SLM is written) by write illumination source 18, the photovoltaic layer produces a current that flows through short circuiting conductor 16 to thereby charge corresponding portions of liquid crystal layer 15. The charging of these liquid crystal portions rotates these portions into a different orientation, thus switching the FLC from off to on, for example In this construction, the switched pixels of the FLC have no way to lose their charge, and thus switch off, when the write illumination is terminated. Thus, nonvolatile data storage is provided.

In the self powered SLM of the invention, a continuous photovoltaic film 14 covers the entire X-Y pixel area of SLM 21, and allows a writing beam such as 18 to activate only selected pixel areas of the photovoltaic film, thus causing a voltage to be generated only in those selected pixel areas of the photovoltaic film, and thereby causing the adjacent liquid crystal film 15 to switch only in its corresponding pixel portions.

Preferably, but without limitation thereto, FLC layer 15 of FIG. 1 acts as an addressable half wave plate. When appropriately oriented, layer 15 rotates the polarization of a transmitted (or reflected) reading light wavefront (not shown) by 90°. Liquid crystal layer 15 thus operates to modulate the intensity of the reading light wavefront when the SLM is placed between crossed polarizer elements (not shown), as is well known by those of skill in the art.

In the transmission mode structure of FIGS. 1-2, no reflector is provided for the reading wavefront. Photodiode layer 14 is sufficiently thin to absorb at most only a fraction of the incident reading light. The writing and reading radiation source may have the same optical characteristics, in which case some of writing light 18 must be absorbed in photodiode layer 14 in order to activate the photodiode layer. Alternatively, the writing and reading light sources may be distinct, in which case the reading light source may be of a wavelength such that virtually none of the reading light is absorbed in layer 14.

Figure 3:
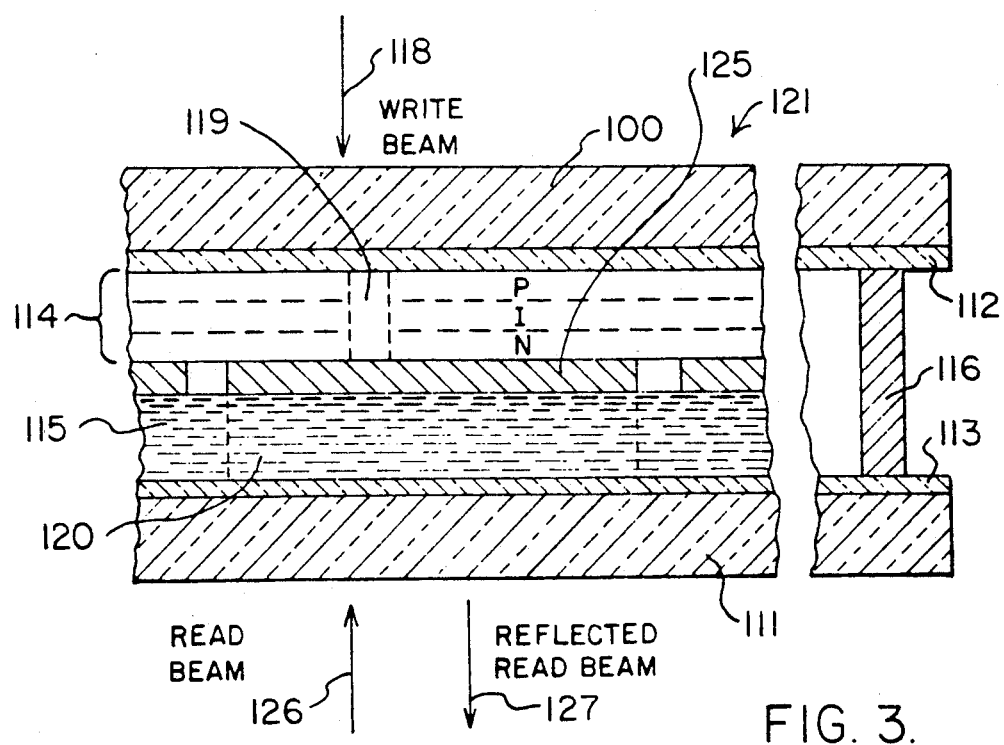

Preferably, but without limitation thereto, photovoltaic layer 14 comprises an a-Si:H based multi-layer film, comprising a p-i-n layer of the type shown and described relative to FIG. 3.

FIG. 3 is a side section view, much like FIG. 1, showing an embodiment of a self powered, reflective mode SLM 121 that is constructed in accordance with the teachings of the invention.

The embodiment of the invention shown in FIG. 3 is a reflective mode SLM 121 that operates to modulate a reading light wavefront 126, causing this reading wavefront to be reflected as a data-containing wavefront 127. The SLM of FIG. 3 may be configured as an X-Y pixel matrix of the general type shown in FIG. 2. Whatever the shape of SLM 121, each individual pixel of the SLM matrix is constructed and arranged as shown in FIG. 3, i.e. each pixel of the matrix is provided with its own individual reflector means 125. Reflector means 125 of FIG. 3 is constructed to reflect read beam 126, and may be provided as a metallic layer, or as a dielectric stack of a plurality of thin dielectric films. In the reflection mode structure of FIG. 3, reflector means 125 optically isolates reading light source 126 and writing light source 118.

When reflector means 125 is formed as dielectric stack, it may comprise a dielectric layer of alternating films having a high index of refraction, such as titanium dioxide, and a low index of refraction, such as magnesium fluoride, that are deposited over the individual pixel portions of voltage/current generating layer 114. In this case, the reflector layer need not comprise a plurality of individual reflectors 125. Rather, a single dielectric reflective layer covers the entire area of the SLM. Such a dielectric reflector may comprise a stack of dielectric films, each stack being ¼ wavelength thick relative to the frequency of reading wavefront 126.

As with previously described embodiments of the invention, the basic construction of SLM 121 includes a pair of transparent glass plates 100,111 on which a pair of electrically conductive and transparent oxide films 112,113 are coated. In accordance with the present invention, one or more internally located shorting electrical conductor bars or lead wires 116 are provided to electrically interconnect conductive films 112,113.

The radiation sensitive layer 114 of FIG. 3 is preferably configured as a p-i-n photodiode, a-Si:H layer. While not critical to the invention, the a-Si:H layer 114 may be deposited by plasma enhanced chemical vapor deposition (PECVD) of silane and other gases onto a heated substrate. A thin p-type layer, on the order of 200 Angstroms thick, is formed by adding approximately 0.5 percent diborane to the silane. The i-type layer contains no dopants and is typically about 3 microns thick, although it can be thinner. The n-type layer may be formed by adding approximately 0.5 percent phosphene to the silane. The n-type layer is also about 200 Angstroms thick, or perhaps less.

The liquid crystal layer 115 of this embodiment of the invention is preferably a FLC. Crystal alignment layers (not shown) are also provided, as is well known.

Note that in the embodiment of FIG. 3 layers 114 and 115 are continuous layers that cover the entire planar area of SLM 121, whereas SLM 121 includes one reflector means 125 for each of the plurality of pixel row/column intersections of the SLM, one such row/column intersection being shown as 22 in FIG. 2. Note that when the reflector means of the SLM comprises a dielectric stack, as above described, an individual reflector need not be provided for each SLM pixel.

Within the teachings of the invention, it is also possible to configure layers 114,115 so that each individual pixel of SLM 121 is provided with its own individual and isolated photodiode portion 114 and its own corresponding individual isolated liquid crystal portion 115, both of which portions 114,115 are then generally configured to correspond to the shape of the individual reflectors 125 of each modulator pixel. In fact, when the SLM includes a reflector function, this function is usually provided by a continuous (i.e. a non-pixelized) dielectric stack layer.

In FIG. 3, an exemplary write beam 118 is shown as activating a small, generally circular area of photodiode layer 114, thus causing this small area of layer 114 to generate a voltage/current. In this embodiment of the invention, the individual pixel reflectors 125 are electrically conductive. Thus, the current that is generated by photodiode portion 119, and which then flows through shorting conductor portion(s) 116, is effective to activate the somewhat larger pixel area 120 of FLC layer 115. In this way, data is stored in the corresponding pixel portion of the SLM, as is defined by the shape of reflector 125.

Reflector 125 can be of any desired shape and size, for example in the range of a less than 10 to as large as a 200 micron square area. Small size pixel reflectors 125 provide high resolution, whereas the use of larger size reflectors 125 provides for ease of fabrication. As an example of another shape for reflectors 125, it may be desirable to form these reflectors in a generally round shape.

In accordance with the teachings of commonly assigned copending U.S. patent application Ser. No. 07/318,775, filed Mar. 2, 1989, and incorporated herein by reference, the reflective mode SLM of FIG. 3 may be configured to include an apertured film that is mounted on the plane of photosensor layer 114, each aperture being spaced from a reflector 125 so as to define an exposed ring-shaped area of photosensor layer 114 surrounding each reflector 125. A plurality of opaque rings are then carried by conductive film 113, so as to overlie each ring-shaped area of exposed photosensor layer 114 that surrounds each reflector 125.

Figure 4:
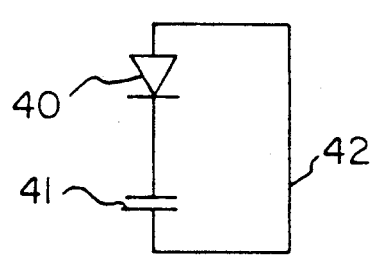

FIG. 4 is a simplified equivalent schematic circuit diagram of SLM devices constructed in accordance with the teachings of the invention, and FIGS. 5–8 are simplified equivalent circuit diagrams of other embodiments of the invention.

In FIG. 4, the voltage/current generating layer of FIGS. 1 and 3 is shown schematically as a photodiode 40, the liquid crystal layer of FIGS. 1 and 3 is shown as a capacitor 41, and the electrical short circuit connection of FIGS. 1 and 3 is shown as an electrical conductor 42.

When liquid crystal 41 is a FLC, the modulator is formed to have a built-in crystal bias, that is, the liquid crystal preferentially aligns itself to one crystal orientation. When photodiode 40 is illuminated by a write light illumination source (not shown), photodiode 40 produces a current that rotates the crystals of FLC layer 41 into the other of two orientations, thus switching FLC 41 from off to on. In this simplified circuit diagram, FLC 41 has no way to lose its charge, and thus switch off, when write illumination of the SLM is terminated.

Figure 5:
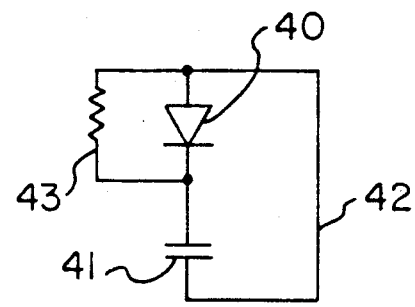

As a feature of the invention, and as is shown in the simplified equivalent circuit of FIG. 5, a resistance path 43 may be provided to shunt photodiode 40 (i.e. to shunt the voltage/current generating layer of FIGS. 1 and 3), to thereby provide a current path for the charge in FLC layer 41 to drain or leak off when the writing illumination source is terminated. This shunt resistance path 43 may be formed by producing a photodiode layer of FIGS. 1 and 3 having imperfect current-blocking contacts.

Figure 6:
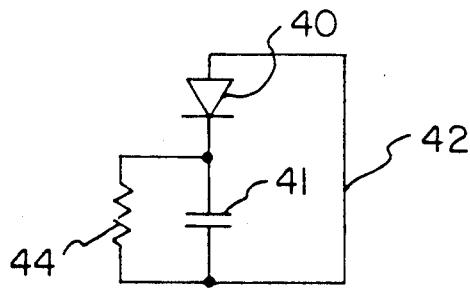

In the FIG. 6 embodiment of the invention the current leakage path for the charge in FLC 41 is provided by a resistance path 44 that shunts FLC layer 41. Electrical circuit function 44 may be accomplished by including appropriate ionic impurities, such as hexadecyl- trimethylammonium bromide into the FLC layer. Shunt resistance path 44 provides an alternate leakage path for the charge in FLC 41 from that shown in FIG. 5.

Figure 7:
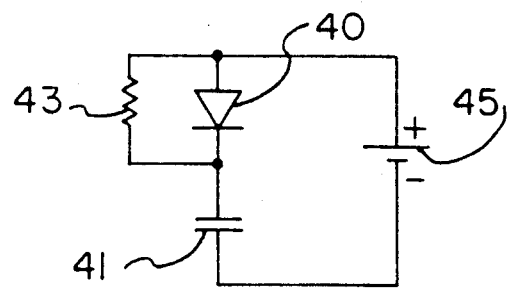
Figure 8:
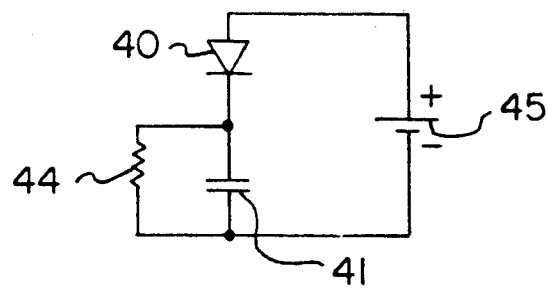

The FIGS. 7 and 8 embodiments the invention provide self-powered SLM device in which a small magnitude, external, electrical DC bias source 45 is provided in place of using a crystal-biased FLC layer 41, as above described. In the absence of a writing light source, externally applied bias source 45 (on the order of 0.25 DC volts in magnitude) operates to switch all pixel portions of FLC 41 off. The writing light source produces a photovoltaic effect in the single P-I-N layer photodiode 40 on the order of 0.5 DC volts magnitude for a single P-I-N layer device, and of an opposite polarity to external source 45, thus switching selected pixel portions of FLC 41 on. When the writing light source is terminated, the voltage across photodiode 40 decreases due to the current flow through resistor 43 of FIG. 7 or resistor 44 of FIG. 8, and the voltage polarity that is then applied to FLC 41 is reversed by operation of bias source 45, thus returning all switched pixels of FLC 41 to their off state. In the arrangement of FIG. 7, FLC 41 may have an asymmetrical transfer function characteristic, and in the absence of writing illumination externally applied bias source 45 operates to switch FLC 41 off.

Embodiments within the spirit and scope of the invention may comprise SLMs that are arranged in any of a variety of physical configurations, such as a two dimensional array of individual pixel or PEL cells as shown in FIG. 2, or the SLMs may comprise but one pixel as in the case of a self darkening window or goggle, as above described. Since modulators constructed in accordance with the teachings of this invention may take a number of physical shapes, the invention is not to be limited to either a two dimensional array, or to an X-Y array.

In the transmission mode SLM of FIG. 1, the modulator's individual pixel portions are transparent to a reading electromagnetic radiation wavefront, and thus the reading wavefront may impinge upon the SLM from either side thereof.

In the reflection mode SLM of FIG. 3 a reflector element 125 is provided for each individual modulator pixel, or one dielectric stack reflector 30 covers the entire SLM. Such reflectors are reflective of the reading wavefront, and it is preferable that the reading wavefront impinge upon the SLM from the liquid crystal side thereof, as is shown in FIG. 3.

The SLM of the invention is written or programmed (i.e. data is stored therein) by activating selected pixel portions of the modulator's voltage/current generating layer, using write light beam(s) as above described. These selected pixel portions define input data, in one form or another, that is to be stored in the SLM.

While best modes of the invention have been described and enabled with reference a number of embodiments thereof, it is recognized that those skilled in the art will, upon being taught the invention, visualize yet other embodiments that are within the spirit and scope of the invention. Thus, it is intended that the spirit and scope of the invention be limited solely by the following claims.

What is claimed is:
1. A light activated light modulator comprising;
   a pair of physically spaced electrically conductive films in confronting relation to each other, a voltage/current generating light sensitive film on one of the conductive films in confronting relation to the other of said conductive films, a liquid crystal layer confined between said other conductive film and said light sensitive film, a shortening circuit element interconnecting said two conductive films, and resistance path means effectively shunting one of said light sensitive film and said liquid crystal layer.

2. The light modulator of claim 1 including a transparent electrically conductive film located intermediate said light sensitive film and said liquid crystal layer.

3. A self-powered light activated spatial light modulator occupying a given planar area, comprising:

photovoltaic/photodiode light sensitive means covering the planar area of said modulator, said light sensitive means having first and second spaced surfaces across which a voltage/current is generated when said photovoltaic light sensitive means is subjected to writing light means, liquid crystal means having first and second surfaces, said first surface of said liquid crystal means being in electrical contact with said first surface of said light sensitive means, resistance path means effectively shunting at least one of said light sensitive means or said liquid crystal means, whereby writing light means may operate to activate selected portions of said light sensitive means, thus causing a voltage/current to be generated in said selected portions of said light sensitive means, and thereby causing said liquid crystal means to be activated in portions thereof corresponding to said selected portions of said light sensitive means.

4. The self-powered spatial light modulator of claim 3, including first and second planar electrically conductive means, said first electrically conductive means being in electrical contact with the second surface of said liquid crystal means, said second electrically conductive means being in electrical contact with the second surface of said light sensitive means and being transparent to said writing light means, and said short circuit means connecting said first electrically conductive means to said second electrically conductive means.

5. A light activated spatial light modulator requiring no externally applied electrical power and occupying a multi-PEL matrix area, comprising:

two light transparent layers of electrically conducting material covering said multi-PEL matrix area, a liquid crystal layer and a voltage/current generating light sensitive layer sandwiched between said two conducting layers and covering said multi-PEL matrix area, electrical conductor means providing a short circuit interconnecting said two conducting layers, and resistance path means effectively shunting said liquid crystal layer and/or said light sensitive layer, such that selective light activation of PEL areas within said light sensitive layer causes a localized voltage/current to be generated in said selectively activated PEL areas, and thus causes the corresponding PEL areas of said liquid crystal layer to be charged by said generated voltage/current.

6. The spatial light modulator of claim 5 wherein said voltage/current generating light sensitive layer is a hydrogenated amorphous silicon (a-Si:H) photodiode layer.

7. The spatial light modulator of claim 6 wherein said liquid crystal layer is a ferroelectric crystal (FLC) layer.

8. The spatial light modulator of claim 6 wherein said liquid crystal layer is a ferroelectric crystal (FLC) layer, and including crystal alignment means associated with said FLC layer to cause said FLC layer to align itself to one crystal orientation, such that when selected PEL areas of said light sensitive layer are written by a write light source, said light sensitive layer produces a voltage/current that operates through said short circuiting electrical conductor means to charge corresponding PEL areas of said FLC layer and thereby rotate said corresponding PEL areas into another crystal orientation.

9. The spatial light modulator of claim 8 wherein the electrical effect of said resistance path means is formed by including ionic impurities in said FLC layer.

10. A light activated light modulator requiring no externally applied electrical power and occupying a single-PEL area, comprising:

two light transparent layers of electrically conducting material covering said area, a liquid crystal layer and a voltage/current generating light sensitive layer sandwiched between said two conducting layers and covering said area, a light transparent and electrically conductive layer interposed between said liquid crystal layer and said voltage/current generating light sensitive layer, electrical conductor means providing a short circuit interconnecting said two conducting layers, and resistance path means effectively shunting one or both of said light sensitive layer and said liquid crystal layer, such that activation of any portion within the area of said light sensitive layer causes a localized voltage/current to be generated thereat, and thus causes the entire area of said liquid crystal layer to be charged by said generated voltage/current by operation of said light transparent and electrically conductive layer.

11. The light modulator of claim 10 wherein said voltage/current generating light sensitive layer is a hydrogenated amorphous silicon (a-Si:H) photodiode layer.

12. The spatial light modulator of claim 11 wherein said liquid crystal layer is a ferroelectric crystal (FLC) layer.

13. The light modulator of claim 11 wherein said liquid crystal layer is a ferroelectric crystal (FLC) layer, and including crystal alignment means associated with said FLC layer to cause said FLC layer to align itself to one crystal orientation, such that when a portion of said light sensitive layer is activated, said light sensitive layer produces a voltage/current that operates through said short circuiting electrical conductor means to charge said FLC layer and thereby rotate said corresponding PEL areas into another crystal orientation.

14. The light modulator of claim 13 wherein the electrical effect of said resistance path means is formed by including ionic impurities within said FLC layer.

15. A light activated light modulator requiring no externally applied electrical power, comprising:

two light transparent layers of electrically conducting material, liquid crystal means and voltage/current generating light sensitive means sandwiched between said two conducting layers, said voltage/current generating means comprising one or more P-I-N layers, the number of said P-I-N layers being selected to match the voltage/current generating characteristics of said voltage/current generating means to the like requirements of said liquid crystal means, electrical conductor means providing a short circuit interconnecting said two conducting layers, and resistance path means effectively shunting said liquid crystal means and/or said light sensitive means.

16. The light modulator of claim 15 including:
a light transparent and electrically conductive layer interposed between said liquid crystal means and said voltage/current generating light sensitive means.

* * * * *